Aug. 6, 1935.　　　　V. FÜRTH　　　　2,010,184
WIRE CABLE
Filed July 31, 1933
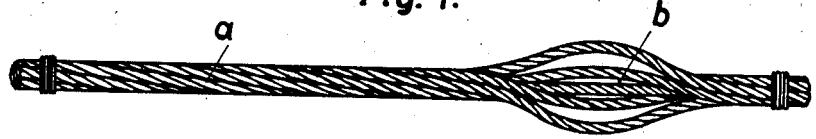
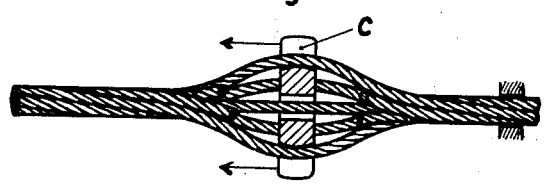
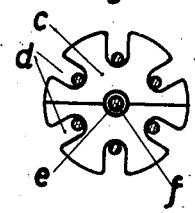
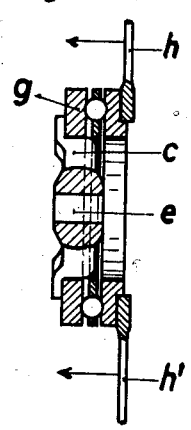
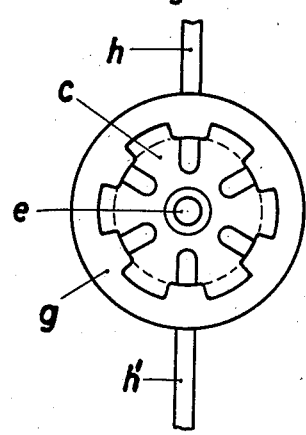
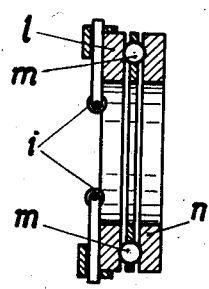
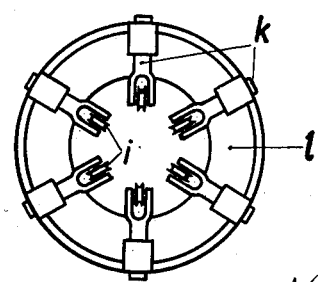

UNITED STATES PATENT OFFICE 2,010,184

WIRE CABLE

Victor Fürth, Cologne-Mulheim, Germany, assignor to Felten & Guilleaume Carlswerk Eisen- und Stahl Actiengesellschaft, Cologne-Mulheim, Germany Application July 31, 1933, Serial No. 683,057
In Germany August 5, 1932

5 Claims. (Cl. 117—16)

For removing the stresses in the finished cable it has already been proposed to treat the cable in a so-called re-forming apparatus. This treatment consists for instance in this, that the cable as a whole is subjected to changes of direction, these changes of direction being in as many planes as possible in order to increase the effect, so that a great number of direction changing means have to be disposed one behind the other. Such arrangements are not only very inconvenient owing to their occupying so much space, but have the disadvantage that for drawing the cable through as a whole over a series of successive deflecting places, great forces are required, so that these parts of the arrangement have to be made exceedingly strong. In this method of treatment the individual elements are very unequally stressed and the cable treated in this manner shows over its whole periphery considerable damage to the individual elements.

The present invention relates to a method in which the hitherto adopted re-treatment of the finished cable as a whole is departed from and in which in an exceedingly simple manner and with very small forces cables of any thickness or of any general dimensions can be made free of stresses and free of twist by hand or by power. The invention is based on the recognition of the fact that for doing away with the stresses in the elements of the cable the cable should not be retreated as a whole but that it is necessary to subject each individual element of the finished cable to a retreatment. This cannot of course be carried out by dividing up the cable into its individual elements and subjecting these to a retreatment but with this object in view according to the present method the finished cable is loosened up at one end or near one end in such a manner that each cable element is raised or bent out of the direction of the cable and that thereupon through the insertion of means which enable the said position to be maintained the individual elements of the finished cable, after the latter has been clamped at one end, are subjected over their entire length continuously by drawing the deflecting means in the direction of the cable to the same re-treatment in all their parts. As, when drawing the deflecting means in the direction of the cable, they have to be able to follow the helical shape of each cable element, the means which are moved in the direction of the cable and serve for deflecting and guiding the cable elements are made capable of turning with respect to the axis of the cable.

In the accompanying drawing, in which similar reference characters designate corresponding parts, Figure 1 shows a length of wire cable, in a part of which the strands are separated preliminary to the reforming treatment. Figure 2 shows the cable with the spider of the separating device inserted between the separated strands of the cable, the spider being shown in cross-section. Figure 3 shows the two-part spider with the cable strands held separate thereby. Figures 4 and 5 respectively show a cross-section and an elevation of the separating device, with the parts assembled in operative relation. Figures 6 and 7 are similar views of a modification of the separating device.

The method shall now be more particularly described with reference to the accompanying drawing, in Fig. 1 of which $a$ is the cable in its finished laid state, ready for dispatch from the works as an ordinary cable. It is wrapped at the ends to prevent it springing open. This cable is loosened at the place $b$, that is to say, the elements (in the figure the strands) are lifted from the core of the cable, being brought out of their normal direction and bent outwards, as illustrated. Fig. 2 shows means $c$ which are introduced into the place $b$ of the cable, loosened as shown in Fig. 1, in such a manner that the cable elements remain, as shown, subjected to a deflection. These means include, as shown in elevation in Fig. 3, a two-part spider $c$ which is provided at its periphery with incisions $d$ to the number of the cable elements to be treated and the central bore $e$ of which takes the core $f$ of the cable. The spider $c$ is, as shown in Fig. 4, surrounded by a ring $g$ (Fig. 4 in cross-section, Fig. 5 in elevation) pushed over the cable which is clamped at one end, being rotatable in the said ring. The ring acts as an abutment for the spider $c$. By holding the handles $h$ and $h'$ the ring $g$ is moved without being turned in the direction of the cable, the helical form of the cable elements (in the example shown the strands) acting as a guide for the rotatable spider and the spider turning in the ring or casing $g$ in the direction of motion mentioned around the cable axis (in one direction or the other according to the direction of laying) (similarly to the projectile owing to the helical rifling in the rifle barrel). In this way the loosened place $b$ (as shown in Fig. 1) travels along the entire length of the cable. It will be readily appreciated that through this treatment of the cable all parts of the cable element will be successively subjected to the same deflection and that through the employment of similar deflections the removal of the stresses in the element will be a uniform one. As, owing to the rotatability of the deflecting spider and owing to the relatively small deflection required for each cable element out of its normal position in the cable, only small forces are required for moving the forming device along, through the use of this method the cable is treated in a very gentle manner. After the application of the method the cable elements show no damage whatever. The use of the above method has the advantage that any ordinary cable can be subsequently converted in a simple manner into a cable which is free from twist and free from stresses. While previously the cable has been rigid and stiff and springs open at the places where it is cut through, it is changed after the application of the method described above into a soft, flexible cable, which holds together firmly at the places where it has been cut through, without parts of the cable springing out of position.

The importance of the proposal just described is in no way changed by substituting for the deflecting means referred to as a spider any similar deflecting device, either a disc provided with openings, rings of balls or the like, and also not if for reducing the friction the deflecting spider is journalled in a supporting ring in the manner of neck and/or footstep bearings. In Figs. 6 and 7 a deflecting device for bending out the cable elements is shown, in which for guiding the cable elements rollers $i$ are provided, the holders $k$ of which are radially adjustable. For reducing the friction the ring $l$ for supporting these roller holders is journalled on balls $m$ with respect to the fixed casing $n$.

Instead of the device being drawn over the finished cable which is clamped at one end, the casing of the device can also be fixed and the cable drawn through. In place of the two-part spider (or other deflecting means) an undivided spider can be used, the cable elements being threaded in at the ends of the cable. Instead of each roller a ring of balls may be used, through the inner opening of which the cable element is guided. It is also possible to place the device described above in a laying machine at the stretch lying just before the drawing off pulley or at any other suitable place.

The method described is applicable to all kinds of cables.

What I claim is:

1. A method of treating finished wire cable to eliminate twisting strains and stresses from the strands of the cable, consisting in locally applying a radial pressure to the strands to separate the same and to force outwardly short bends in the individual strands to eliminate twisting strains and stresses from such bends, and moving the point of the local application of the radial pressure longitudinally along the cable to treat progressively the individual strands.

2. A device for removing stresses in finished wire cables, comprising a disc having openings for supporting the separate elements of a loosened end of the cable and a guiding ring surrounding the said disc, in which the disc can rotate.

3. A device for removing the stresses in finished cables, comprising a disc with a number of openings corresponding to the number of strands of the cable to be operated on disposed on a circle having the cable axis as its centre so as to be equidistant from one another and at a distance from the cable axis corresponding to the desired degree of deflection of the cable elements and means for supporting the disc at its periphery so as to be capable of rotating.

4. A device for removing stresses in finished cables, comprising rollers adapted to be inserted under the individual elements at one end of a cable after said elements have been loosened and separated and of travelling along to the other end of the cable, holders for the said rollers, a ring for supporting the said holders, means for radially displacing the said holders in the said ring and a stationary ring in which the supporting ring of the roller holder is adapted to rotate.

5. A method of removing stress in finished wire cables comprising separating the cable elements in a radial direction at some point in the cable thus causing a short portion of each element to be bent out of its normal path and progressively causing every portion of each element to pass through paths corresponding to that of the originally bent-out portion and allowing them to return to their original positions.

VICTOR FÜRTH.